(12) United States Patent
Onishi et al.

(10) Patent No.: US 9,884,551 B2
(45) Date of Patent: Feb. 6, 2018

(54) CAP

(71) Applicant: TOYOTA JIDOSHA KABUSHIKI KAISHA, Toyota-shi, Aichi-ken (JP)

(72) Inventors: Hirofumi Onishi, Aichi-gun (JP); Masaaki Kondo, Owariasahi (JP); Akira Yamashita, Toyota (JP); Yuji Furuta, Kiyosu (JP); Yukio Yoshida, Kiyosu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/931,960

(22) Filed: Nov. 4, 2015

(65) Prior Publication Data

US 2016/0137057 A1 May 19, 2016

(30) Foreign Application Priority Data

Nov. 14, 2014 (JP) .................................. 2014-232038

(51) Int. Cl.
*B60K 15/04* (2006.01)
*B60L 11/18* (2006.01)

(52) U.S. Cl.
CPC ...... *B60K 15/0406* (2013.01); *B60L 11/1896* (2013.01)

(58) Field of Classification Search
CPC ........ B60K 15/0406; B60K 2015/0429; B60K 2015/0464; B60K 2015/048
See application file for complete search history.

(56) References Cited

U.S. PATENT DOCUMENTS

| 5,730,194 A | * | 3/1998 | Foltz | B60K 15/04 137/588 |
|---|---|---|---|---|
| 8,490,661 B1 | * | 7/2013 | Leipold | B60K 15/04 141/312 |
| 2009/0309386 A1 | | 12/2009 | Yamamoto | |
| 2010/0218849 A1 | * | 9/2010 | Hagano | B60K 15/04 141/350 |
| 2012/0000134 A1 | * | 1/2012 | Hagano | B60K 15/0406 49/386 |

FOREIGN PATENT DOCUMENTS

| CA | 2 372 422 | * | 11/2000 |
| CN | 101370682 A | | 2/2009 |
| CN | 103303131 A | | 9/2013 |

(Continued)

*Primary Examiner* — Gregory Strimbu
(74) *Attorney, Agent, or Firm* — Finnegan, Henderson, Farabow, Garrett & Dunner, LLP

(57) ABSTRACT

A cap includes a main body attached to an end part of a charging port for fuel gas. The main body includes an elastic deformable portion for locking the main body to the end part when the main body is attached to the end part. The cap further includes a cover covering at least part of the elastic deformable portion and surrounding the main body. The elastic deformable portion at least partially elastically deforms when the main body is attached to the end part and when the main body is detached from the end part. The cover is a separate member from the main body. When the elastic deformable portion elastically deforms, the cover applies force to the elastic deformable portion in a direction opposite from the deforming direction.

2 Claims, 4 Drawing Sheets

(56) References Cited

FOREIGN PATENT DOCUMENTS

| | | | |
|---|---|---|---|
| DE | 112007000117 T5 | | 11/2008 |
| DE | 10 2010 045 475 | * | 1/2012 |
| EP | 1 690 727 | * | 8/2006 |
| FR | 2 904 269 | * | 2/2008 |
| JP | S57-95346 U | | 12/1956 |
| JP | 2007-196920 | | 8/2007 |
| JP | 2011-225016 | | 11/2011 |
| JP | 2012-159151 | | 8/2012 |
| KR | 20-1998-0010685 U | | 5/1998 |
| KR | 10-2013-0105372 A | | 9/2013 |
| WO | WO 2010/021829 | * | 2/2010 |

\* cited by examiner

CAP

CROSS-REFERENCE TO RELATED APPLICATION

This application claims priority based on Japanese Patent Application No. 2014-232088, filed on Nov. 14, 2014, the contents of all of which are incorporated herein by reference in their entirety.

BACKGROUND

Field

The present invention relates to a cap.

Related Art

Recently, practical applications of vehicles to which a fuel cell which causes electrochemical reactions between fuel gas and oxidizing gas is mounted have been progressed. The oxidizing gas is not necessarily stored in the vehicle because air is used as the oxidizing gas; however, the fuel gas is necessarily stored in the vehicle. Therefore, an art regarding a cap which seals a charging port through which fuel gas is charged into a fuel gas tank of a vehicle is known. For example, JP2007-196920A discloses such a cap which seals a charging port by locking a convex portion provided at an inner wall of the cap, to the charging port.

However, since the convex portion carries all the load which is applied to the cap when attaching the cap to the charging port and when detaching the cap from the charging port in this case, there has been a possibility of wearing out or damaging the convex portion. For this reason, an increase in durability of the convex portion is desired.

SUMMARY

The present invention is made in order to solve at least a part of the subject described above, and can be implemented in view of the following aspects.

(1) According to one aspect of the invention, a cap is provided. The cap includes a main body attached to an end part of a charging port of fuel gas, an elastic deformable portion provided to the main body and for locking the main body to the end part when the main body is attached to the end part, and a cover covering at least part of the elastic deformable portion and surrounding the main body. The elastic deformable portion at least partially elastically deforms when the main body is attached to the end part and when the main body is detached from the end part. The cover is a separate member from the main body. When the elastic deformable portion elastically deforms, the cover applies a force to the elastic deformable portion in a direction opposite from the deforming direction. According to this aspect, the cover bears part of the force that is applied to the elastic deformable portion when the main body is attached to the charging port and when the main body is detached from the charging port. Therefore, the load on the elastic deformable portion is reduced and the durability thereof is increased. As a result, the durability of the entire cap increases.

(2) In the cap of the aspect described above, the elastic deformable, portion may be integrally formed with the main body. The main body may be formed with a through-hole surrounding at least part of the elastic deformable portion. The cover may cover the through-hole. According to this aspect, since the cover covers the through-hole, it can be suppressed that foreign matters enter inside the cap through the through-hole.

Note that the present invention can be implemented in various forms. For example, the invention can be implemented in forms, such as a method of manufacturing the cap, a computer program which realizes the manufacturing method, and a recording medium in which a computer program which implements the manufacturing method is stored.

DESCRIPTION OF EMBODIMENTS

A. Embodiment

Figure 1:
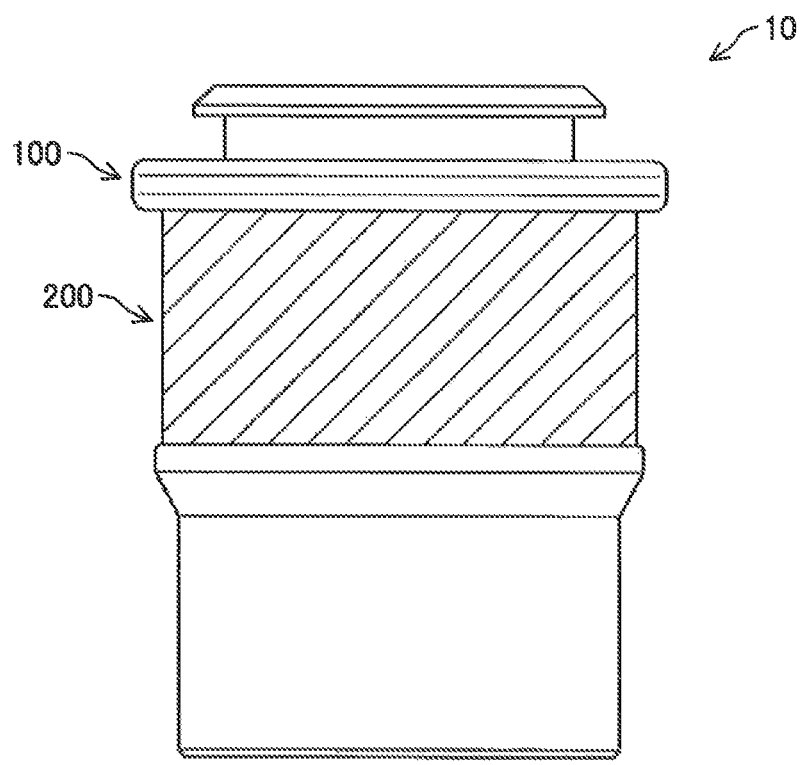
FIG. 1 is an external view of a cap as one embodiment of the present invention.

FIG. 1 is an external view of a cap 10 as one embodiment of the present invention. The cap 10 seals a charging port of fuel gas which is used for a fuel cell. The cap 10 includes a main body 100 and a cover 200. In this embodiment, hydrogen gas is used as the fuel gas. Further in this embodiment, a case where both of the cap 10 and the charging port have a circular shape in cross section is considered.

The main body 100 is attached to an end part of the charging port of the fuel gas. In this embodiment, the main body 100 is made of resin.

Figure 2:
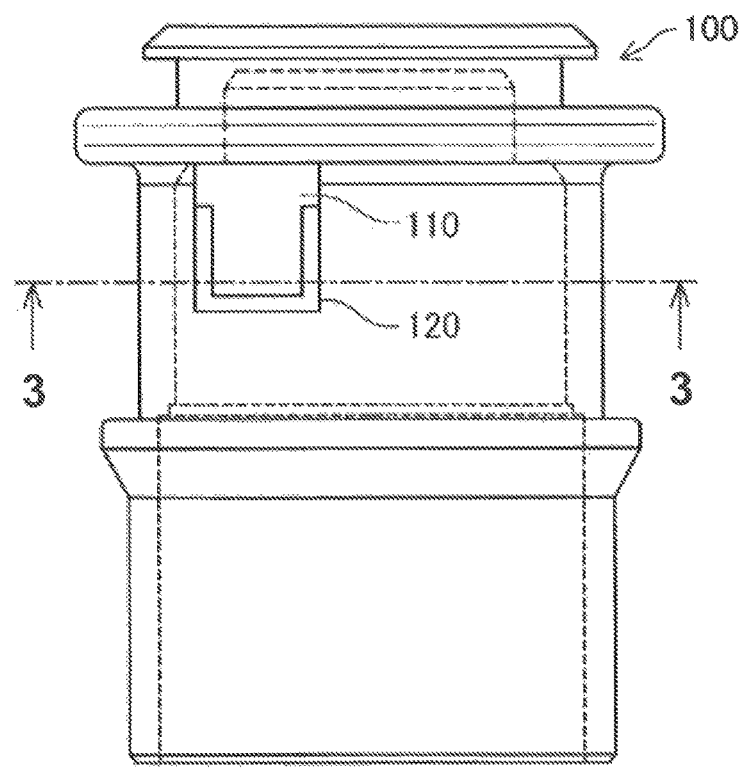
FIG. 2 is a view for describing a main body.

FIG. 2 is a view for describing the main body 100. The part indicated by dashed lines indicates a shape of an inner wall of the main body 100. The main body 100 is hollow. The main body 100 has an elastic deformable portion 110 and a through-hole 120.

The elastic deformable portion 110 locks the main body 100 to the end part of the charging port of the fuel gas in a state where the main body 100 is attached to the end part of the charging port of the fuel gas. Moreover, at least part of the elastic deformable portion 110 elastically deforms when attaching the main body 100 to the end part of the charging port of the fuel gas and also when detaching the main body 100 from the end part of the charging port. In this embodiment, the elastic deformable portion 110 is integrally formed with the main body 100. The through-hole 120 surrounds at least part of the elastic deformable portion 110.

Figure 3:
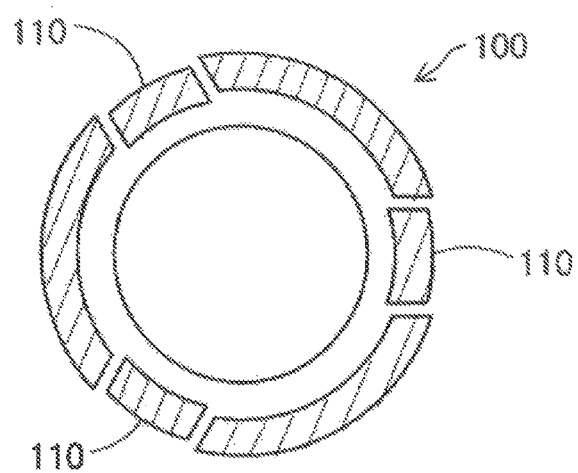
FIG. 3 is a cross-sectional view of FIG. 2 taken along a line 3-3.

FIG. 3 is a cross-sectional view of FIG. 2 taken along a line 3-3. The elastic deformable portion 110 includes a plurality of elastic deformable portions 110 in the main body 100. Each of the elastic deformable portions 110 is designed to protrude inward compared to other part of the main body 100, so that the elastic deformable portion 110 is locked to a concave portion formed at a corresponding position of the end part of the charging port.

The cover 200 (see FIG. 1) of the cap 10 is a separate member from the main body 100. In this embodiment, the cover 200 is made of an elastic material. The cover 200 covers at least part of each elastic deformable portion 110 and surrounds an outer circumference of the main body 100, in other words, the cover 200 also has a circular shape in cross section. In this embodiment, the cover 200 covers the elastic deformable portion 110 entirely. Further, when at least part of the elastic deformable portion 110 elastically deforms, the cover 200 applies a force on to elastic deformable portion 110 in a direction opposite from the deforming direction.

Figure 4A:
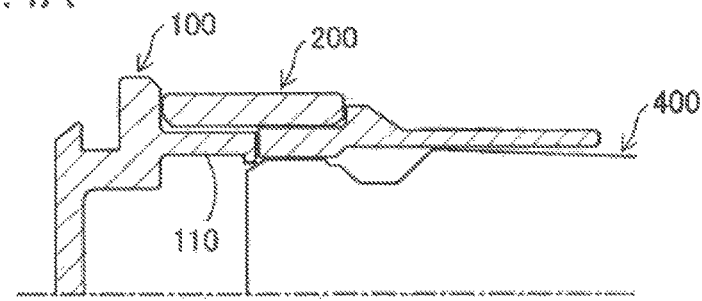
FIG. 4A is a view for describing a first stage of a force application on an elastic deformable portion by a cover.
Figure 4B:
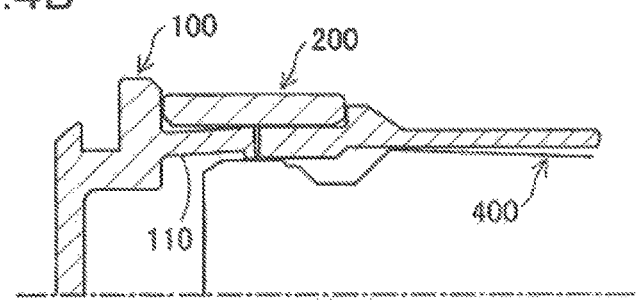
FIG. 4B is a view for describing a second stage of the force application on the elastic deformable portion by the cover.
Figure 4C:
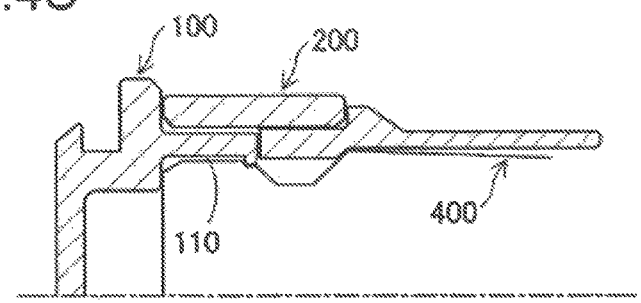
FIG. 4C is a view for describing a third stage of the force application on the elastic deformable portion by the cover.
Figure 4D:
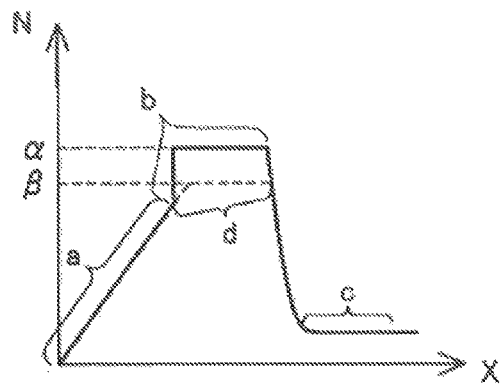
FIG. 4D is a chart illustrating a force applied on an end part.

FIGS. 4A to 4C are views for describing respective stages of the force application on each elastic deformable portion 110 by the cover 200. FIG. 4A indicates a first stage which is immediately after the end part 400 of the charging port contacts with the elastic deformable portion 110. FIG. 4B indicates a second stage in which the end part 400 and the elastic deformable portion 110 are in contact with each other and the elastic deformable portion 110 and the cover 200 are in contact with each other. FIG. 4C indicates a third stage in which the elastic deformable portion 110 is locked to the concave portion formed in the end part 400. FIG. 4D is a chart illustrating the force application on the end part 400 in a period from immediately before the end part 400 contacts with the elastic deformable portion 110 until the elastic deformable portion 110 of the cap 10 is locked to the concave portion formed in the end part 400. In FIG. 4D, the vertical axis indicates a force (N), and the horizontal axis indicates a position (X) of the end part 400.

As illustrated in FIG. 4A, immediately after the end part 400 contacts with the elastic deformable portion 110, the end part 400 receives a force from the elastic deformable portion 110. The first stage in FIG. 4A corresponds to a range "a" in FIG. 4D. Within the range a, the force applied on the end part 400 increases as at least part of the elastic deformable portion 110 elastically deforms.

Then, by the contact between the elastic deformable portion 110 and the cover 200 as illustrated in FIG. 4B, the cover 200 applies the force to the elastic deformable portion 110. The direction in which the cover 200 applies the force is opposite to the deforming direction of the elastic deformable portion 110. The second stage in FIG. 4B corresponds to a range "b" if in FIG. 4D. A force a which is applied to the end part 400 within the range b is a sum of the force caused by the elastic deformation of at least part of the elastic deformable portion 110 and the force applied to the elastic deformable portion 110 by the cover 200. The force applied to the elastic deformable portion 110 by the cover 200 is a reaction force against the force acting to enlarge the cover 200 in a radial direction thereof by the deformation of the elastic deformable portion 110.

Then, the elastic deformable portion 110 is locked to the concave portion formed in the end part 400 as illustrated in FIG. 4C. In this stage, the end part 400 only receives the force from the elastic deformable portion 110. The third stage in FIG. 4C corresponds to a range "c" in FIG. 4D.

Meanwhile, a range "d" in FIG. 4D corresponds to a state where the cover 200 is not attached to the main body 100. A force β which is applied to the end part 400 within the range d only includes the force caused by the elastic deformation of at least part of the elastic deformable portion 110. if the force caused by the elastic deformable portion 110 is to be increased to the force α(>β), since the elastic deformable portion needs to he deformed more, the freedom in designing the elastic deformable portion will he restricted.

Note that a difference between the force applied within the range b and the force applied within the range d is the force which the cover 200 bears.

In this embodiment, since the force which is applied to the end part 400 is applied by the elastic deformable portion 110 and the cover 200, the force to be applied by the elastic deformable portion 110 can be set low. Therefore, the durability of the elastic deformable portion 110 increases, and as a result, the durability of the entire cap 10 increases.

Note that the cover 200 covers each through-hole 120 (see FIG. 1). Therefore, it can be suppressed that foreign matters enter inside the cap 10 through the through-hole 120. As a result, occurrence of scratches by the foreign matters being sandwiched between the cap 10 and the end part 400 can be reduced.

Further, the cap 10 is attached to the end part of the charging port of hydrogen gas. Since hydrogen gas is normally charged at 0° C. or below, if water enters inside the cap 10, the water freezes between the cap 10 and the end part 400. As a result, the cap 10 is firmly fixed to the end part 400. However, since the cover 200 covers the through-hole 120, the entering of water inside the cap 10 through the through-hole 120 can be suppressed. Thus, the occurrence of the situation in which the cap 10 is firmly fixed to the end part 400 can be reduced.

B. Modifications

B1. First Modification

In this embodiment, when the cap 10 is not attached to the end part 400, the elastic deformable portion 110 is not in contact with the cover 200; however, without limiting to this, the elastic deformable portion 110 may be in contact with the cover 200 also when the cap 10 is not attached to the end part 400.

B2. Second Modification

In this embodiment, an inner surface of the cover 200 is flat; however, the present invention is not limited to this.

Figure 5:
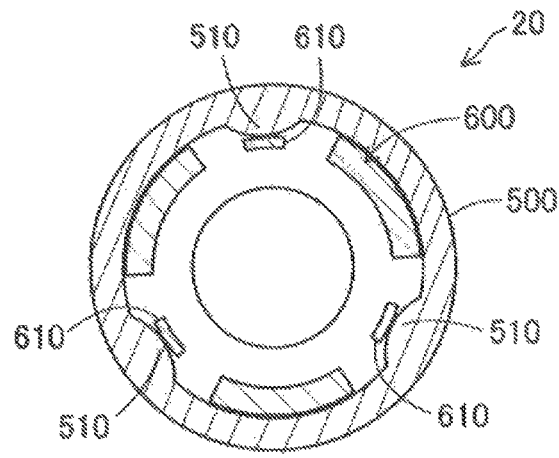
FIG. 5 is a view illustrating a cross-sectional view of a cap as a modification of the embodiment.

FIG. 5 is a cross-sectional view of a cap 20 as the second modification of the embodiment.

As illustrated in FIG. 5, convex portions 510 may he provided to an inner surface of a cover 500 of the cap 20 so as to protrude toward elastic deformable portions 610 of a main body 600 of the cap 20, at positions corresponding to the elastic deformable portions 610, respectively.

B3. Third Modification

In this embodiment, an outer surface of the cover 200 is flat; however, the present invention is not limited to this.

Figure 6:
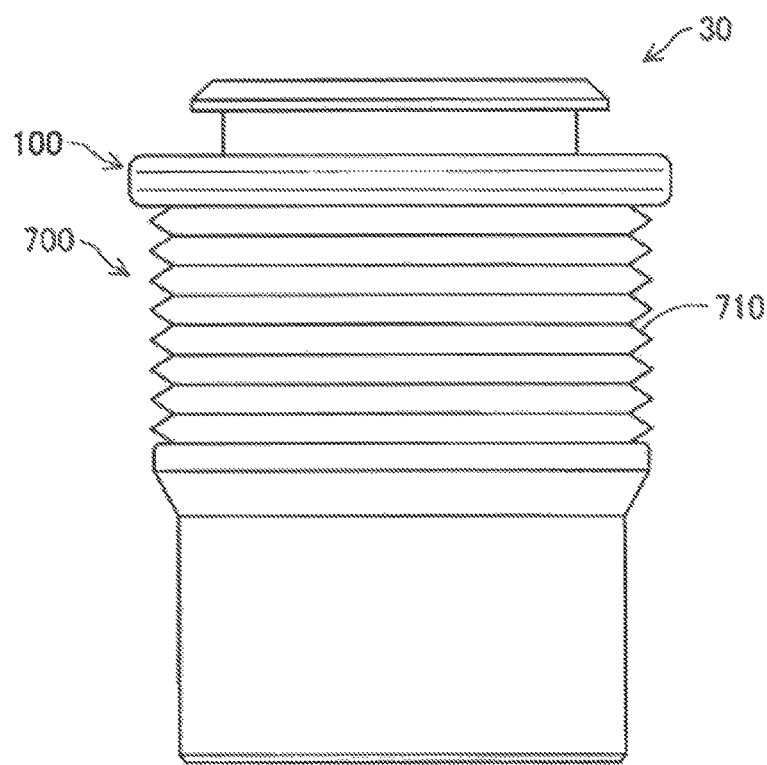
FIG. 6 is an external view of a cap as another modification of the embodiment.

FIG. 6 is an external view of a cap 30 as the third modification of the embodiment. The cap 10 and the cap 30 have the same structure except for the outer surface of the cover. An outer surface of a cover 700 of the cap 30 has an uneven portion 710 shaped such that circular concave portions and circular convex portions are alternately aligned in the axial direction of the cap 30. In this manner, in a case where a user grips the cap 30, he/she can grip the cap 30 firmly. Note that the shape of the uneven portion 710 of the cover 700 is not limited to the above shape, and by providing at least one of the concave portion and the convex portion at the outer surface of the cover 700, the similar effect can be obtained.

B4. Fourth Modification

In this embodiment, the number of elastic deformable portions 110 is three; however, the prevent invention is not limited to this. The number of the elastic deformable portion 110 is flexible according to the force applied to the end part 400.

The present invention is not limited to the embodiment and modifications described above, and can be implemented in various structures without departing from the scope of the invention. For example, technical features in the embodiment and modifications corresponding to technical features of each aspect cited in the section of "SUMMARY," can suitably be substituted and/or combined in order to achieve some or all of the subjects described above, or in order to obtain some or all of the effects described above. The technical features can suitably be deleted if they are not described as essential matters in this specification.

What is claimed is:

1. A cap, comprising:
a main body attached to an end part of a charging port for fuel gas, wherein:
  one end of the main body is blocked,
  the main body includes a first portion and an elastic deformable second portion partially separated from the first portion for locking the main body to the end part when the main body is attached to the end part, and
  the elastic deformable second portion at least partially elastically deforms in a deforming direction with respect to the first portion when attaching the main body to the end part and when detaching the main body from the end part; and
a cover covering at least part of the elastic deformable second portion and surrounding the main body, the cover being a separate member from the main body,
wherein when the elastic deformable second portion elastically deforms in the deforming direction, the cover directly contacts the elastic deformable second portion and applies a force to the elastic deformable second portion in a direction opposite to the deforming direction; and
wherein when the main body is attached to the end part, the elastic deformable second portion of the main body is attached to and contacts the end part of the charging port and the cover does not apply the force to the elastic deformable second portion.

2. The cap in accordance with claim 1, wherein
the elastic deformable second portion is integrally formed with the first portion of the main body,
the main body is formed with a through-hole surrounding at least part of the elastic deformable second portion, and
the cover covers the through-hole.

* * * * *